United States Patent [19]

Weiler

[11] 4,392,436
[45] Jul. 12, 1983

[54] KNOCKDOWN METAL TABLE

[75] Inventor: Raywood C. Weiler, Fontana, Calif.

[73] Assignee: BMC Products, Chicago, Ill.

[21] Appl. No.: 207,295

[22] Filed: Nov. 17, 1980

[51] Int. Cl.³ .................. A47B 1/04; A47B 13/18; A47B 91/00
[52] U.S. Cl. .................. 108/81; 108/28; 108/50; 108/90; 108/156; 182/17; 312/250; 312/257 R
[58] Field of Search ........ 312/257 A, 257 SK, 257 R, 312/250; 108/81, 28, 29, 90, 97, 50, 156; 403/217; 182/17

[56] References Cited

U.S. PATENT DOCUMENTS

| Re. 12,973 | 6/1909 | Hendricks | 108/28 |
| 1,437,195 | 11/1922 | Rasmussen | 312/257 SK |
| 2,710,784 | 6/1955 | Morin | 312/257 SK |
| 2,782,086 | 2/1957 | Gaston | 108/81 |
| 2,798,652 | 7/1957 | Easton | 182/17 |
| 3,605,652 | 9/1971 | Mohr | 108/81 X |
| 3,981,250 | 9/1976 | Anthony | 108/156 X |

FOREIGN PATENT DOCUMENTS 2265302 10/1975 France ................ 312/257 R

Primary Examiner—James T. McCall
Attorney, Agent, or Firm—Arnstein, Gluck & Lehr

[57] ABSTRACT

A knockdown metal table having legs and a flanged top and including auxiliary components such as a drop leaf and modesty panel having attaching means which in assembly are clamped between the legs and the table flanges. A lift assembly including casters is attached to the legs and is adapted to be selectively actuated to move first one pair of casters and then the other into or out of engagement with a floor surface to permit rolling of the table over said floor surface or to rest the table on the floor surface in a desired position.

8 Claims, 11 Drawing Figures

KNOCKDOWN METAL TABLE

BACKGROUND OF THE INVENTION

This invention relates to a knockdown metal table having auxiliary components such as a drop leaf and modesty panel which are attached to the table without additional fasteners. The table also includes lift means provided with casters which may be selectively moved into floor engaging position to permit easy movement of the table over a floor surface.

One of the objects of this invention is the provision of a knockdown table which includes a drop leaf and a modesty panel and which may be compactly shipped and readily assembled at the point of use with a minimum of effort and skill.

Another object of this invention is the provision in a table of the foregoing type of means for supporting caster wheels in such a manner that they may be easily rendered effective for moving the table over a floor surface and ineffective as when positioning the table in a desired location.

Another object of this invention is the provision of novel means for detachably securing a drop leaf and a modesty panel to the legs and table top without the use of additional fastening elements.

Other and further objects and advantages of this invention will become apparent from the following description when considered in connection with the accompanying drawings.

BRIEF DESCRIPTION OF A PREFERRED EMBODIMENT

The present invention constitutes an improvement on my U.S. Pat. No. 3,945,740 in that it includes the basic construction shown in the patent and additionally utilizes auxiliary components which render the table more versatile for use.

Figure 1:
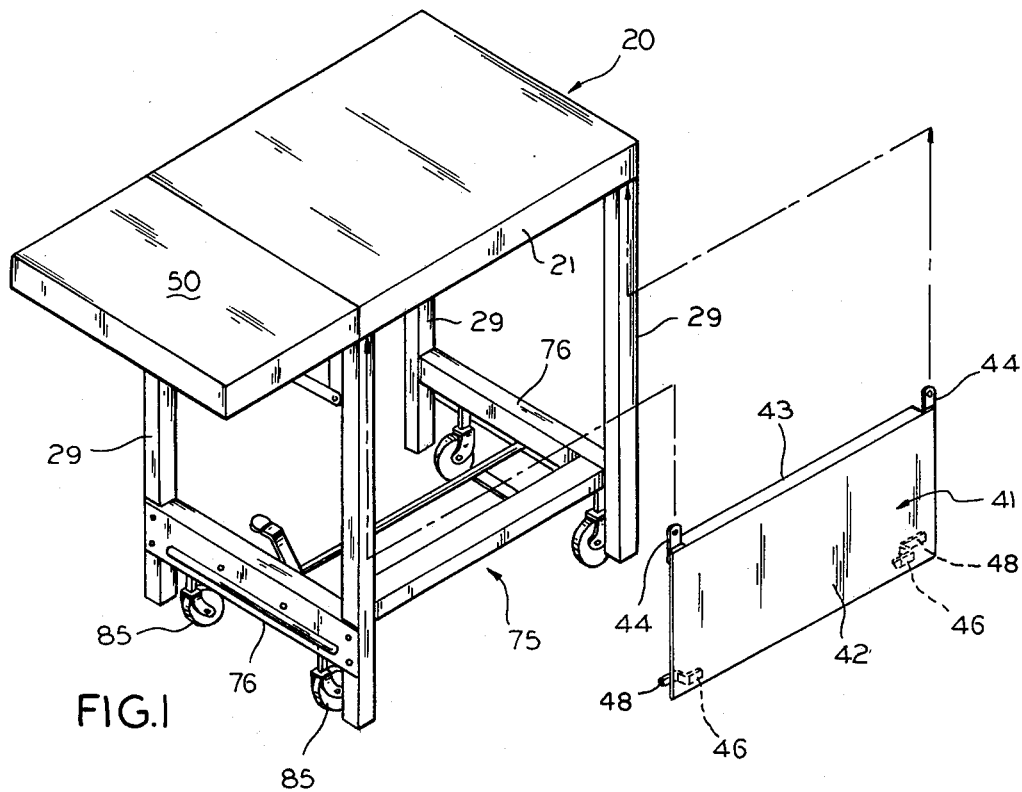
FIG. 1 is a perspective view of a metal table in accordance with my invention, showing a panel component in separated relation.
Figure 2:
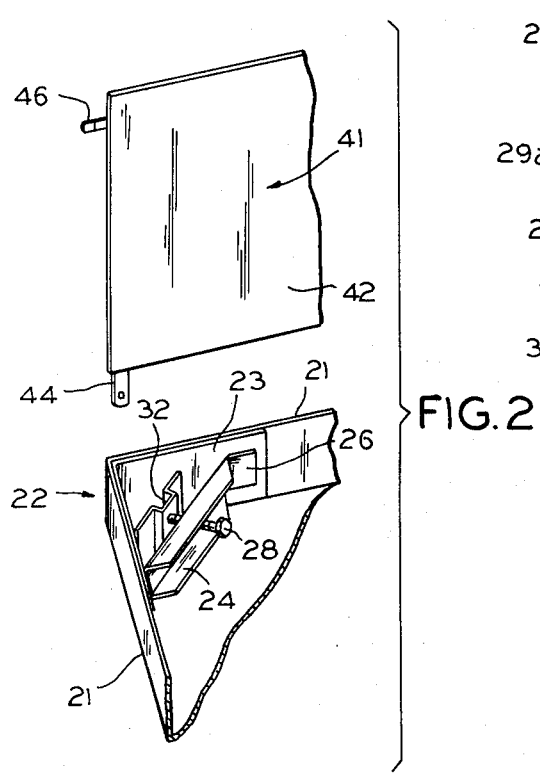
FIG. 2 is a fragmentary perspective view showing a corner of the underside of the table with a leg removed and a component panel in separated relation.
Figure 3:
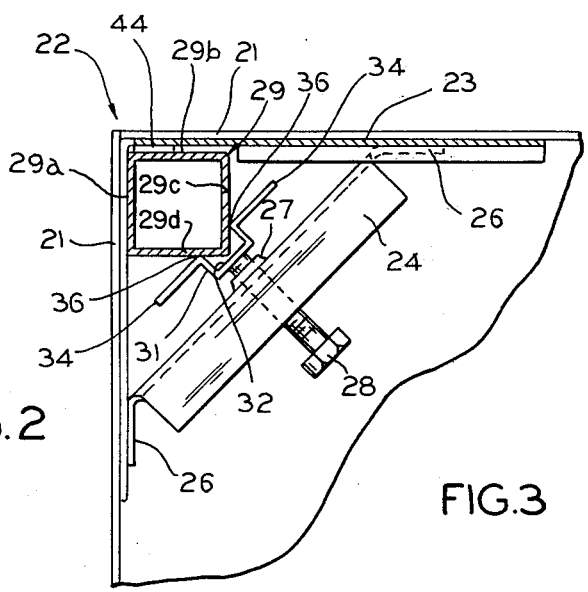
FIG. 3 is a fragmentary bottom plan view, partly in cross section, of one of the corners of the table.

Referring to FIGS. 1, 2 and 3 of the drawings, the basic construction includes a table top preferably of sheet metal or wood, generally indicated at 20, having four side walls 21 forming four right angle corners 22. A reinforcing sheet metal right angle member 23 is welded to the inner surfaces of adjacent side walls 21 if the side walls are not integral with each other, forming the corner. A channel shaped brace 24 extends diagonally across corner 22 and has terminal tab portions 26 welded to the side wall 21, or to the member 23 if present. The web of the channel shaped brace 24 is provided with an embossment 27 which is threaded, for example by welding a nut thereon, to receive a headed screw 28. A tubular leg 29 formed of square sheet metal tubing is positioned as shown in FIG. 3 with two adjacent sides 29a and 29b in abuttment with the adjacent inner sides of a reinforcing right angle 23. A sheet metal clamping member 31 having a U-shaped configuration 32 with integral outwardly turned wings 34 forming corners 36 is disposed intermediate the leg 29 and the end of screw 28 with the corners 36 engaging adjacent sides 29c and 29d of leg 29. Rotation of screw 28 in a clockwise direction will apply clamping pressure on the leg 29 to secure the same in the corner in assembled relation with the table top 20.

It will be apparent that the table top 20 and legs 29 may be shipped in knockdown condition and easily assembled as with simple household tools and with a minimum of skill.

In the present invention the clamping function of the elements of the basic construction is advantageously utilized to secure auxiliary components, hereinafter to be described, to the basic construction to increase versatility of the table.

Referring to FIGS. 1 and 3–5 one of the auxiliary components constitutes a modesty panel 41 which comprises a rectangular sheet metal plate 42 having an upper and lower integral longitudinal rigidifying flange 43, both of which terminate short of each end of the plate. A pair of tabs 44, one at each end, are rigidly welded to the plate 42 at its upper end. A pair of generally S-shaped brackets 46 are pivotally secured to plate 42, as at 47. Each of the brackets 46 has an arm 48 offset from the plane of plate 42 a distance approximately the width of a side of leg 29.

Figures 4, 5:
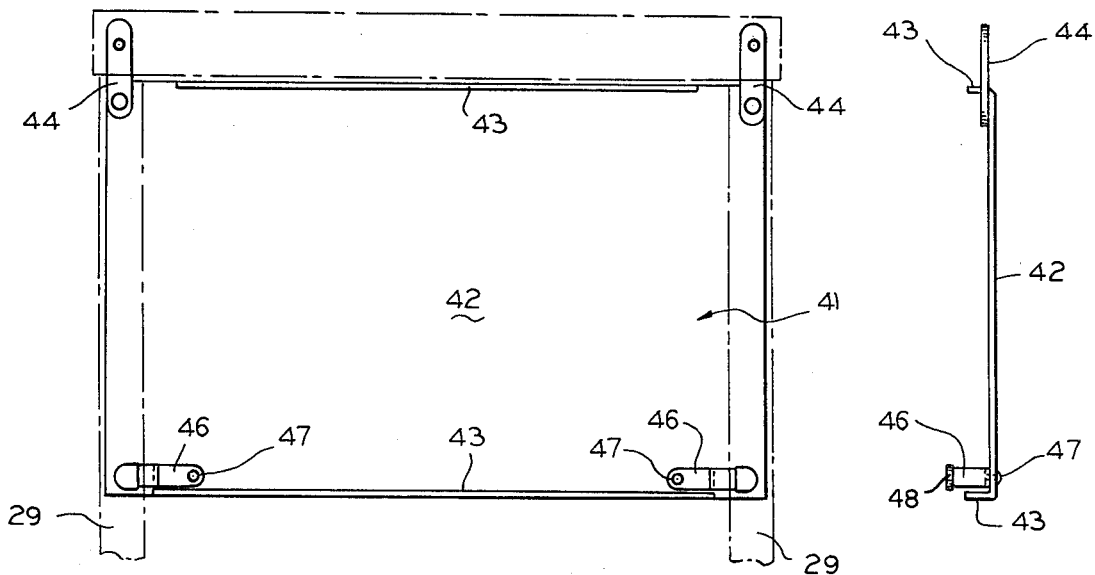
FIG. 4 is a fragmentary elevational view showing a panel component assembled to the table.
FIG. 5 is an end elevational view of the panel component shown in FIG. 4.

In order to mount the panel 41 to one end of the table, the table top preferably is placed bottom side up on a supporting surface and two of the legs are positioned, one at each of two adjacent corners, as shown in FIG. 3. With the brackets 46 vertically disposed and with the screws 28 in relaxed condition, the tabs 44 are inserted, each between a side 29b of a leg and the adjacent sidewall 21, or a leg of a reinforcing angle member 23 if present, to the point where the upper flange 43 abuts the lower edge of the side wall 21 of the table. When the screws 28 are rotated to clamp the parts together the panel 44 is securely locked in position. The brackets 46 then are swung over to horizontal positions so as to engage the sides 29b of respective legs, as shown in FIG. 4, to secure the panel 42 continguous to the sides 29b of the legs.

Figure 8:
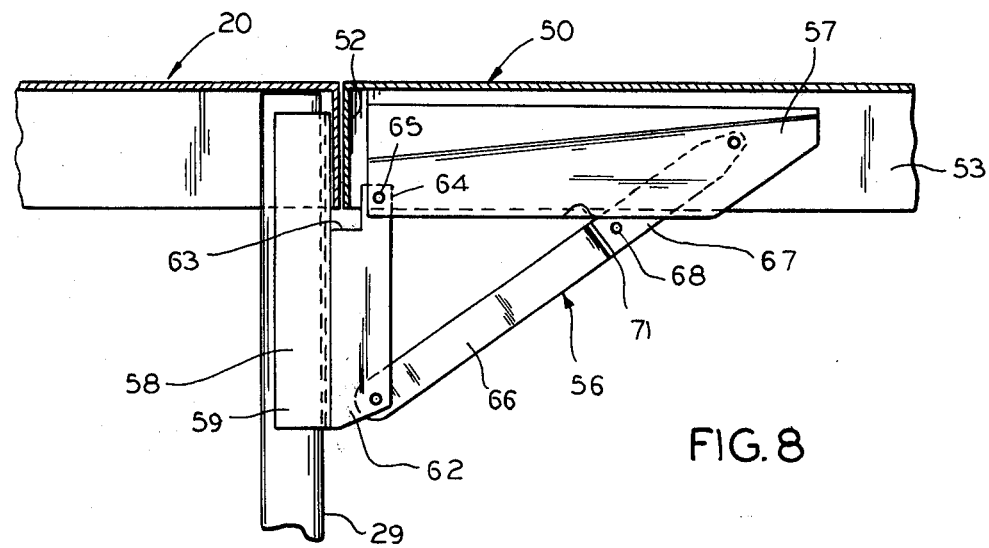
FIG. 8 is a side elevational view, partly in cross section, showing the drop leaf component attached to the table.

The drop leaf component accessory 50 shown in FIGS. 1 and 6–10 comprises a rectangular top 51, preferably of sheet metal or wood to match top 20, having depending side and end flanges 52 and 53, respectively, forming four right angles, each reinforced by an angular brace 54 welded to the flanges. A hinge and mounting assembly 56 is welded to each end wall 53 if the latter is integral with the top, or is attached to the top 51 with screws (not shown) if the top is wood, each such assembly comprising a sheet metal plate member 57 shaped substantially as shown in FIG. 8. A mounting bracket 58 is pivotally secured to plate member 57. The mounting bracket 58 is stamped preferably from sheet metal into a configuration having two right angle bends, as shown in clearly in FIG. 7, to provide an intermediate wall portion 59 and oppositely directed offset portions 61 and 62. The upper part of wall portion 62 is cut away, as shown in FIG. 8, to provide a clearance area, as at 63, and a tab 64. The tab is pivotally connected to plate 53, as at 65. A pair of toggle links 66 and 67 are pivotally connected respectively to wall portion 62 and plate member 57 and to each other, as at 68. Link 67 terminates in a laterally bent tab 71 which serves as a stop, as will be presently explained.

Figures 6, 7:
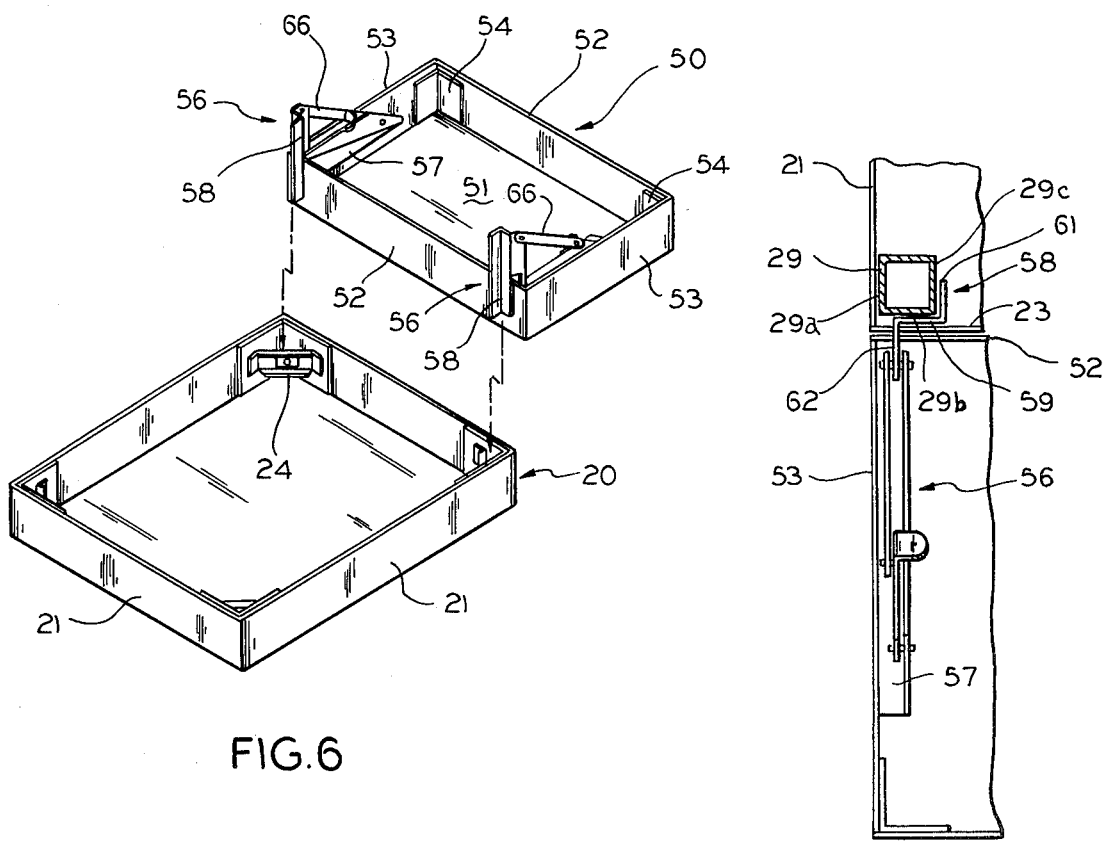
FIG. 6 is an exploded perspective underside view of the table and drop leaf component illustrating its manner of assembly.
FIG. 7 is a fragmentary bottom plan view of the table and drop leaf component.

In order to assemble the drop leaf component 50 to the end of table 20, as shown in FIG. 1, each bracket 58 is positioned adjacent a respective leg 29, as shown in FIG. 7 with the wall portion 59 disposed between the adjacent side wall 21, or flange 23 if present, and wall 29b of leg 29. Wall portion 61 of the bracket is positioned adjacent wall 29c of leg 29 and screw 28 is turned to urge member 31 into clamping engagement with leg 29 in the same manner hereinbefore described. The lengths of the wall portions of bracket 58 are such as to achieve a high degree of rigidity in the assembled parts when the screws are properly tightened. The tabs 71 serve as stops abutting against the lower edges of flanges 53 to limit the movement of the toggle links 66 and 67. The drop leaf component 50 may be easily moved from horizontal to vertical position and vice versa.

The table of the present invention includes a lift assembly provided with casters which may be easily manipulated to selectively shift the casters into floor engaging position to render the table movable or, into retracted position, after movement of the table has been effected.

Figure 9:
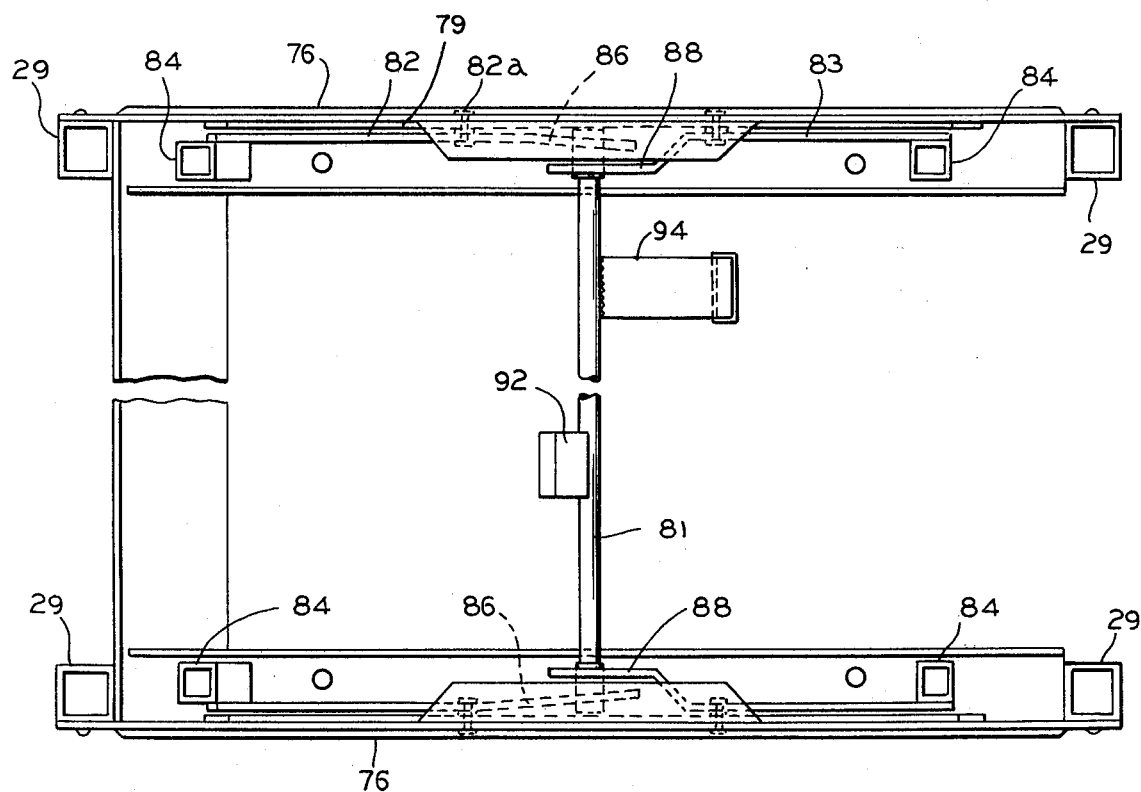
FIG. 9 is a bottom plan view of the table.
Figure 10:
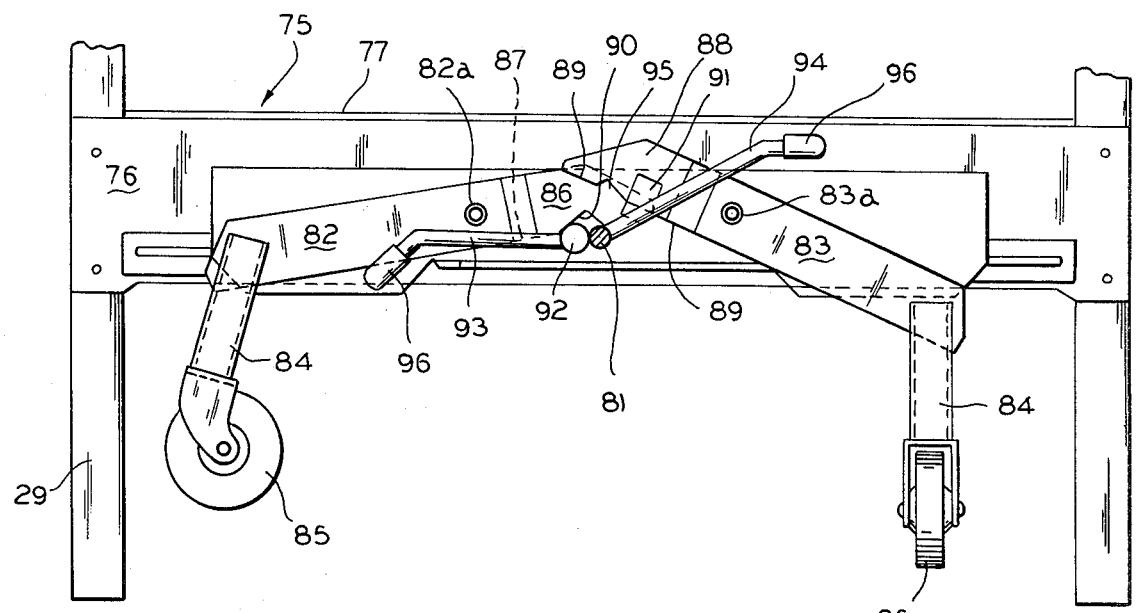
FIG. 10 is a fragmentary side elevational view of the lower part of the table.
Figure 11:
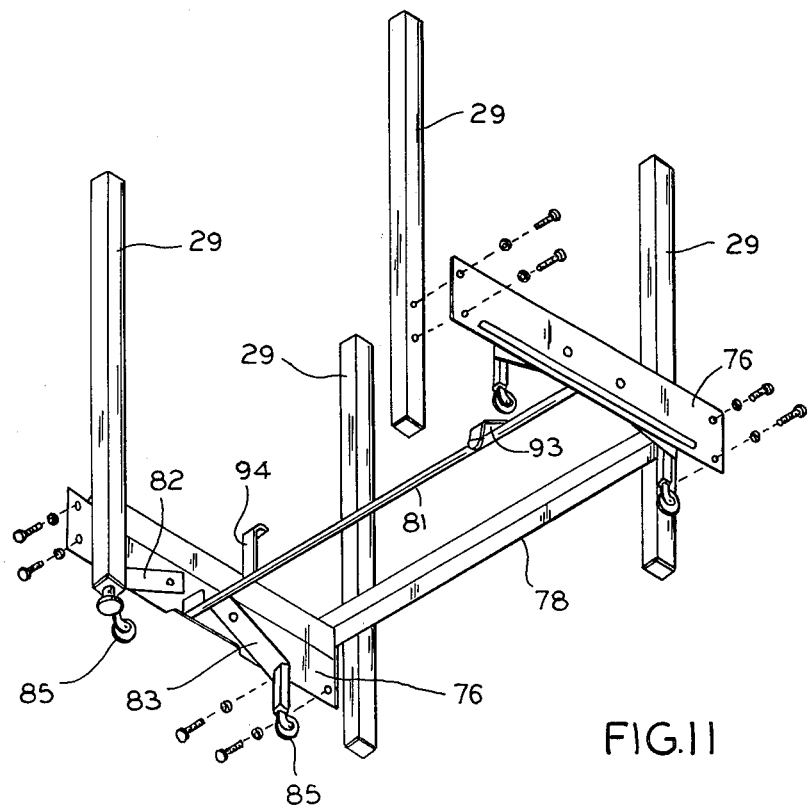
FIG. 11 is an exploded perspective view of the table with auxiliary components removed.

Referring to FIGS. 9-11, the lift means 75 comprises two identical assemblies, each including a sheet metal plate 76 having an upper right angle flange 77. The plate 76 is adapted to be attached to the lower portions of an end pair of legs 29, as with sheet metal screws. The plates 76 are connected by an angle brace 78. A bearing support plate 79 is secured adjacent each plate 76 and includes a hole in which is journalled one end of a lift rod 81, the lift rod extending longitudinally of the table. Pivotally secured to each support plate 79 as at 82a and 83a are a pair of lift arms 82 and 83, respectively, each having rigidly welded to its distal end a tubular caster socket 84 adapted to receive the spindle of a caster 85. As will be seen in FIG. 10, each socket 84 is disposed in obtuse angular relation to a respective lift arm 82, 83. Lift arm 82 includes an offset end portion 86 having a cam follower edge 87 having a detent 90. Lift arm 83 includes an offset end portion 88 having a cam follower edge 89 having a detent 95. A lug 91 is welded to lift arm 83 and serves as a stop, as will be hereinafter explained. As will be seen in FIGS. 9 and 10 the offset end portions 86 and 88 of the respective lift arms overlap each other and overhang the lift rod 81. Welded to the overhanging portion of lift rod 81 is a short cylindrical member 92 which is disposed in the path of movement of the offset portions 86 and 88. The member 92 functions as a cam acting on the offset portions 86 and 88 to influence the pivotal movement of the lift arms 82 and 83, as will be presently explained. A pair of actuating levers 93, 94 are welded to the lift rod 81 and extend in opposite directions. Each lever is provided at its distal end with a toe engaging pad 96.

As will be apparent by reference to FIG. 10 lift rod 81 may be rocked about its axis by alternately manipulating the actuating levers 93, 94 so as to revolve member 92 about the axis of lift rod 81. When the legs 29 are at rest on a floor surface and the casters 85 are in fully retracted condition edge 87 of lift arm 82 is in engagement with a low point of cam member 92 while edge 89 of lift arm 83 is spaced a short distance above the cam member 92. Accordingly, as viewed in FIG. 10, when the actuating arm 94 is depressed, cam member 92 is rocked clockwise to first act on lift lever 82 to rock the same counterclockwise to cause the left hand caster 85 to move downwardly toward floor engaging position. As the cam member 82 moves upwardly, edge 89 of lift lever 83 thereafter is engaged by the cam member 92 which causes lift lever 83 to rock in a clockwise direction to move the right hand caster 85 downwardly into floor engaging position. In such floor engaging position cam member 92 is abutted against stop lug 91 and is received in both detents 90 and 95. The table is now in condition to be rolled on a floor surface to a desired location because legs 29 are elevated from the floor surface. At such location lever 93 is depressed to rock cam member 92 counterclockwise. The weight of the table itself is sufficient to cause the lift arms 82 and 83 to maintain contact with cam member 92 as they are rocked about their respective axes 82a and 83a to effect retraction of the casters 85 so that they are rendered ineffective and the legs 29 are in floor engaging position.

It will be apparent from the foregoing that as the casters 85 are moved downwardly from retracted to floor engaging position, the pair of casters on the left hand side of FIG. 10 will first make contact with the floor surface and then the casters on the right hand side will make such contact. Correspondingly, when lever 93 is actuated to render the casters 85 ineffective the pair of casters on the right hand side will be first retracted and then the pair of casters on the left hand side will follow. Thus, movement of the table in relation to a floor surface, both up and down, is effected in two stages, thereby minimizing the effort required to raise or lower the table when it is supporting a typewriter or like article having substantial weight.

Various changes coming within the spirit of my invention may suggest themselves to those skilled in the art; hence, I do not wish to be limited to the specific embodiments shown and described or uses mentioned, but intended the same to be merely exemplary, the scope of my invention being limited only by the appended claims.

I claim:

1. In combination a generally rectangular table and an auxiliary component removably attached thereto, said table including a horizontal member having depending flanges forming a plurality of corners, and a plurality of legs each being defined by four sides with adjacent sides being perpendicular so that said legs are generally square shaped in cross section, a diagonal connecting member at each of said corners, each of said diagonal connecting members having threaded means, a screw member received in each of said threaded means, said screw members being adjustable relative to said legs, a U-shaped member diagonally positioned and engaged by each of said screw members with spaced sides of each of said U-shaped members engaging the innermost right angle corner of one of said legs and adapted to apply pressure against said leg to hold said leg in one of said corners formed by said depending flanges, said screw members when retracted permitting removal of said legs, said auxiliary component including a pair of spaced attaching means each having a flat portion with each such portion being adapted to be received between a corresponding one of said legs and flanges before the screw member is adjusted to secure said leg to one of said corners formed by said depending flanges.

2. The invention as defined in claim 1 in which said auxiliary component comprises a panel extending between a pair of said legs.

3. The invention as defined in claim 1 in which said auxiliary component comprises a drop leaf hinged to said attaching means and adapted to be selectively moved to horizontal or vertical positions.

4. The invention as defined in claim 3 in which said attaching means includes a flange integral with said flat portion and in which said flange and said flat portion engage adjacent sides of one of said legs when in assembled relation.

5. The invention as defined in claim 3 including a pair of toggle links connecting said drop leaf and said attaching means.

6. In combination with a table having two pairs of legs, lift means including a plate member secured to each of said pairs of legs, two pairs of lift arms with each of said pairs of lift arms pivotally secured intermediate its ends to one of said plate members with the inner ends of said pairs of lift arms overlapping each other, a caster supported at the outer end of each of said lift arms, a lift rod journalled in said plate members and having a pair of cam elements with one disposed at each end so as to engage the inner ends of a respective pair of said lift arms, means for rotating said lift rods so as to effect sequential engagement of said cam elements first with one of said pairs of lift arms and then with the other of said pairs of lift arms so as to effect substantially vertical movement of said casters, one delayed behind the other, into or away from engagement with a floor space to thereby elevate or lower said table.

7. The invention as defined in claim 1 including lift means attached to said legs of said table for selectively elevating or lowering said legs in relation to a floor surface so as to permit movement of said table over said floor surface for location of said table in a desired position.

8. The invention as defined in claim 7 in which said table includes two pairs of said legs and said lift means includes a plate member secured to each pair of said legs, two pairs of lift arms with each of said pairs of lift arms pivotally secured intermediate its ends to one of said plate members with the inner ends of said lift arms overlapping each other, a caster supported at the outer ends of each of said lift arms, a lift rod journalled in said plate members and having a pair of cam elements with one disposed at each end so as to engage the inner ends of a respective pair of said lift arms, and means for rotating said lift rod so as to effect sequential engagement of said cam elements first with one of said pairs of lift arms and then with the other of said pairs of lift arms so as to effect substantially vertical movement of said casters, one delayed behind the other, into or away from engagement with a floor surface to thereby elevate or lower said table.

* * * * *